(12) United States Patent
Schmidt et al.

(10) Patent No.: US 10,212,662 B2
(45) Date of Patent: *Feb. 19, 2019

(54) SYSTEMS, METHODS AND DEVICES FOR SMALL CELL ACTIVATION AND DETECTION

(71) Applicant: INTEL IP CORPORATION, Santa Clara, CA (US)

(72) Inventors: Andreas Schmidt, Braunschweig (DE); Maik Bienas, Schöppenstedt (DE); Michael Faerber, Wolfratshausen (DE); Martin Hans, Braunschweig (DE)

(73) Assignee: INTEL IP CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/415,607

(22) Filed: Jan. 25, 2017

(65) Prior Publication Data

US 2017/0135036 A1    May 11, 2017

Related U.S. Application Data

(63) Continuation of application No. 14/316,316, filed on Jun. 26, 2014, now Pat. No. 9,572,108.

(51) Int. Cl.
*H04M 9/00* (2006.01)
*H04W 52/02* (2009.01)
(Continued)

(52) U.S. Cl.
CPC ....... *H04W 52/0225* (2013.01); *H04W 24/02* (2013.01); *H04W 48/16* (2013.01);
(Continued)

(58) Field of Classification Search
CPC .......... H04M 11/00; H04M 1/24; H04M 1/64; H04M 1/725; H04M 3/53; H04M 3/5307; H04W 24/00; H04W 4/12
(Continued)

(56) References Cited

U.S. PATENT DOCUMENTS 8,391,886 B1 * 3/2013 Thaper .............. H04M 3/42348
455/414.1
8,909,244 B2 * 12/2014 Curticapean .......... H04W 64/00
455/456.1
(Continued)

FOREIGN PATENT DOCUMENTS

JP     2014512145 A    5/2014
JP     2015500605 A    1/2015
(Continued)

OTHER PUBLICATIONS

U.S. Appl. No. 14/316,316, Restriction/Election Requirement, dated Dec. 11, 2015, 6 pages.
(Continued)

*Primary Examiner* — Joseph Arevalo
(74) *Attorney, Agent, or Firm* — Stoel Rives LLP

(57) ABSTRACT

Methods, systems, and devices for enabling wireless communication devices in a cellular wireless network to utilize small cells having coverage within a macro cell are disclosed herein. User equipment (UE) can detect the need for using a booster providing a small cell, detect availability of small cells and submit a request to infrastructure of the cellular wireless network to aid in connection with the booster that provides the small cell. The request can be enhanced with small cell location queries, small cell activation requests and/or assistance data to enable meaningful small cell selection.

8 Claims, 12 Drawing Sheets

(51) Int. Cl.
*H04W 48/16* (2009.01)
*H04W 24/02* (2009.01)
*H04W 16/32* (2009.01)
*H04W 84/04* (2009.01)
*H04W 84/12* (2009.01)

(52) U.S. Cl.
CPC ... *H04W 52/0206* (2013.01); *H04W 52/0229* (2013.01); *H04W 16/32* (2013.01); *H04W 84/045* (2013.01); *H04W 84/12* (2013.01); *Y02D 70/00* (2018.01); *Y02D 70/1224* (2018.01); *Y02D 70/1226* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01)

(58) Field of Classification Search
USPC .................. 455/440, 414.1, 435.1, 456.1
See application file for complete search history.

(56) References Cited

U.S. PATENT DOCUMENTS

| | | | |
|---|---|---|---|
| 9,325,483 B2* | 4/2016 | Karsi | .................. H04L 5/0073 |
| 2010/0240397 A1 | 9/2010 | Buchmayer et al. | |
| 2013/0007728 A1 | 1/2013 | Oh | |
| 2013/0231090 A1 | 9/2013 | Koide et al. | |
| 2014/0011479 A1 | 1/2014 | Puga et al. | |
| 2014/0071943 A1 | 3/2014 | Lee et al. | |
| 2014/0321282 A1* | 10/2014 | Pragada | ............ H04W 36/0072 370/235 |
| 2015/0092676 A1* | 4/2015 | Periyalwar | ............ H04W 4/029 370/329 |
| 2015/0312824 A1* | 10/2015 | Thalanany | .......... H04W 36/165 455/435.1 |
| 2015/0373593 A1 | 12/2015 | Ryu et al. | |

FOREIGN PATENT DOCUMENTS

| | | |
|---|---|---|
| WO | 2010126344 A2 | 11/2010 |
| WO | 2012142436 A1 | 10/2012 |
| WO | 2013086410 A2 | 6/2013 |

OTHER PUBLICATIONS

U.S. Appl. No. 14/316,316, Non-Final Office Action, dated Jan. 22, 2016, 11 pages.
U.S. Appl. No. 14/316,316, Final Office Action, dated Jul. 28, 2016, 4 pages.
U.S. Appl. No. 14/316,316, Notice of Allowance, dated Oct. 5, 2016, 8 pages.
PCT/US2015/032825, International Preliminary Report on Patentability, dated Jan. 5, 2017, 7 pages.
PCT/US2015/032825, International Search Report and Written Opinion, dated Sep. 14, 2015, 10 pages.

* cited by examiner

FIG. 11

1102 → SmallCellInfo ::= SEQUENCE (SIZE (1..MaxNumberSC)) OF SmallCellContainer

SmallCellContainer ::= SEQUENCE {
    SmallCellIdentifier INTEGER (0..31)
    SmallCellDimension ::= SEQUENCE {
1104 →         SmallCellCenter LocationInfo
        SmallCellRadius ENUMERATED {5m, 10m, 15m, 20m, 25m, 50m, 100m, 200m}
        DimensionTolerance ENUMERATED {p1, p2, p5, ..., p40, p50, p60}
    RFfingerprint ::= SEQUENCE {
        ListEUTRA ::= SEQUENCE (SIZE (1..EUTRAmax)) OF FingerprintEUTRA
        ListUTRA ::= SEQUENCE (SIZE (1..UTRAmax)) OF FingerprintUTRA
        ListGERAN ::= SEQUENCE (SIZE (1..GERANmax)) OF FingerprintGERAN
    }
    FingerprintTolerance ENUMERATED {p1, p2, p5, ..., p40, p50, p60}
    TrafficSuitability ENUMERATED (real-time, delay-tolerant)
    MobilitySupport ENUMERATED (high, mid, low)
    }
}

FingerprintEUTRA ::= SEQUENCE {
    physCellId PhysCellId
1106 →     cgi-Info SEQUENCE {
        cellGlobalId CellGlobalIdEUTRA
        trackingAreaCode TrackingAreaCode
        plmn-IdentityList PLMN-IdentityList2
    }
    rsrp RSRP
    rsrq RSRQ
}

FingerprintUTRA ::= SEQUENCE {
    physCellId CHOICE {
        fdd PhysCellIdUTRA-FDD
1108 →         tdd PhysCellIdUTRA-TDD
    }
    cgi-Info SEQUENCE {
        cellGlobalId CellGlobalIdUTRA
        locationAreaCode BIT STRING (SIZE (16))
        routingAreaCode BIT STRING (SIZE (8))
        plmn-IdentityList PLMN-IdentityList2
    }
    RSCP INTEGER (-5..91)
    EcN0 INTEGER (0..49)
}

FingerprintGERAN ::= SEQUENCE {
    carrierFreq CarrierFreqGERAN
    physCellId PhysCellIdGERAN
1110 →     cgi-Info SEQUENCE {
        cellGlobalId CellGlobalIdGERAN
        routingAreaCode BIT STRING (SIZE (8))
    }
    rssi INTEGER (0..63)
}

SYSTEMS, METHODS AND DEVICES FOR SMALL CELL ACTIVATION AND DETECTION

RELATED APPLICATION

This application is a continuation of U.S. Non-Provisional patent application Ser. No. 14/316,316, filed Jun. 26, 2014, which is hereby incorporated by reference herein in its entirety.

TECHNICAL FIELD

The present disclosure relates to wireless cellular service and more particularly relates to cellular transfer and activation.

BRIEF DESCRIPTION OF THE DRAWINGS

FIG. 11 is a table illustrating code describing location data consistent with embodiments disclosed herein.

DETAILED DESCRIPTION OF PREFERRED EMBODIMENTS

Figure 1:
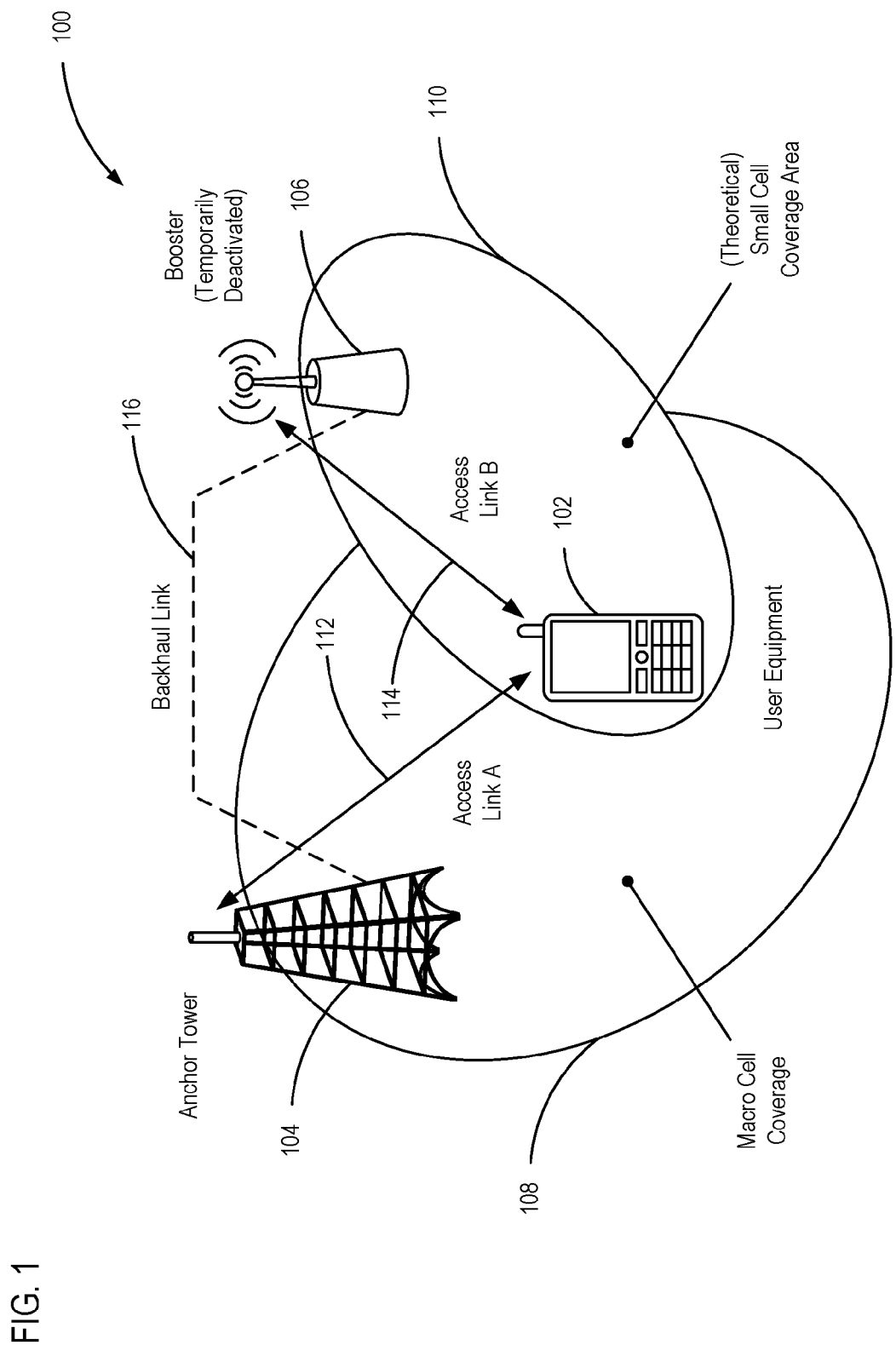
FIG. 1 is a schematic diagram illustrating a communication system consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable wireless communication devices in a cellular wireless network to utilize small cells having coverage within a macro cell. For example, a wireless communication device can detect the need for using a booster providing a small cell, detect availability of small cells and submit a request to infrastructure of the cellular wireless network to aid in connection with the booster that provides the small cell. The request can be enhanced with small cell location queries, small cell activation requests and/or assistance data to enable meaningful small cell selection. An anchor tower (such as an evolved node B (eNB) in the 3rd Generation Partnership Project (3GPP) long term evolution (LTE)) selects small cells that match the assistance data received from the UE (e.g., describing the UE's current or predicted communication needs, etc.) and to inform the UE about both small cell deployment locations and small cell activation results for matching small cells Using these techniques, apparatus and methods can result in small cell activation, meaningful small cell selection and/or dissemination of small cell deployment locations. Small cell activation allows UEs to request small cells that were turned off for power saving be reactivated when UEs in their coverage area express a need. Meaningful small cell selection enables small cells to be selectively activated to serve a given UE and, in some embodiments, only when a need is given in the request. UEs can be provisioned with location information of small cells coverage areas (or the deployment locations of respective small cell base stations) that are active and suited in a respective area.

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. Mobile broadband networks can include various high speed data technologies, such as 3GPP LTE systems. In 3GPP radio access networks (RANs) in LTE systems, the base station can include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE).

In some embodiments, a UE has network demands that are taxing on a base station (also known as a "macro station" having macro cell coverage). In one example, this situation occurs when a base station is near or already over subscribed for data usage. In another example, this situation occurs when a UE has high data or low latency requirements. Instead of taxing the base station, the UE with the help of the wireless network infrastructure determines whether a second smaller-area cellular station (also known as a "small cell" or "booster" or "small-area wireless access node") can service the UE. If the small cell can service the UE, the UE can transfer all or some of its network traffic to the small cell. In many embodiments, the small cell service overlaps with the base station service area.

For example, cellular communication networks can include the macro cell layer (with macro cell base stations for instance operating according to GSM/GPRS/EDGE, UMTS, or LTE/LTE Advanced) accompanied with an additional small cell layer. In some embodiments, these additional small cells will primarily be deployed for capacity improvement (e.g., in traffic hot spots), or for coverage enhancements (e.g., at macro cell edge, or in coverage holes of the macro cell layer, such as subway stations, shopping malls, etc.). The small cell layer will be offered by small, low power base stations that can for instance be mounted at street furniture and alike. Small cell base stations (also referred to as "Booster eNB" or "booster") can offer access links to UE according to LTE, millimeter wave technology (mmWave), or both of these radio technologies.

Small cell base stations can have a wired backhaul connection into the mobile network operator's core network. There can be cases however in which a wired backhaul connection is not possible for a variety of different reasons (e.g., too difficult or expensive to be installed). Another option for seamless integration of small cell base stations into the existing network topology of a mobile communication network is therefore the usage of mmWave frequency bands also for backhaul links. In some embodiments, for wireless backhaul provisioning it can be advantageous to deploy small cell base stations under macro cell coverage, and to let one of the macro cell base stations serve the small cell base station wirelessly. A macro cell base station that is serving a small cell base station is referred to as "Anchor eNB," "Anchor Tower" or "anchor."

Figure 2:
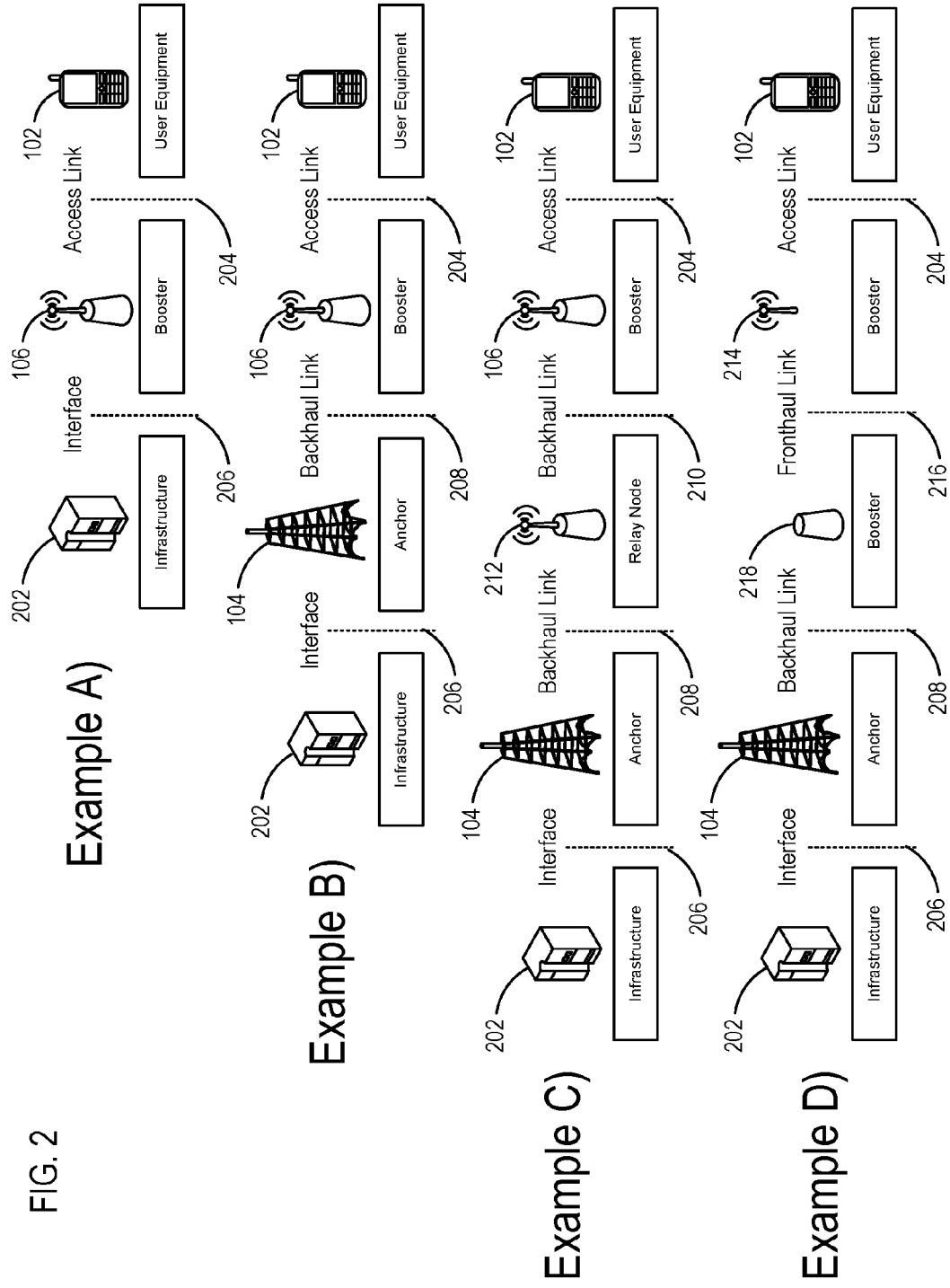
FIG. 2 is a schematic diagram illustrating four examples of infrastructure to support a small cell consistent with embodiments disclosed herein.

A wireless backhaul link can be a direct point to point connection between booster and anchor, or it can be a multi-hop connection with a number of mmWave capable relay nodes in between, as shown in FIG. 2. In one embodiment it can be possible that mmWave capable infrastructure nodes serve as a relay and booster at the same time (i.e. a combined relay/booster device). Frequency bands in the mmWave range are well suited to offer larger bandwidths. Furthermore they have excellent spatial reuse properties that can be exploited for a higher degree of network densification.

In some embodiments, the infrastructure side provides detailed information about small cell locations to UEs, either in broadcast mode to all UEs in a given cell, or via dedicated signaling to a selected number of UEs. In another embodiment, these pieces of information are disseminated by an infrastructure node upon UE request. In another embodiment, a method allows UEs not only to query location details about small cell sites, but also to submit requests for small cell activation.

Turning to FIG. 1, an example of a portion of a radio access network (RAN) system 100 that includes a single cellular air interface (such as an LTE/LTE-Advanced access link) being provided between the anchor 104 and the UE 102 (i.e. on Access Link A), and an air interface (a supplemental network interface such as an mmWave based interface) being provided between the booster 106 and the UE 102 (i.e. on Access Link B). UE 102 is located in within macro cell coverage 108. The UE 102 determines that connection with a booster 106 will be beneficial to a user of the UE 102. The UE 102 requests the wireless infrastructure (e.g. the anchor tower 104 or core network which is not shown in FIG. 1) to provide a booster 106. The wireless infrastructure can select a list of available boosters 106 that are in the area of the UE 102 or can service the UE 102. The wireless infrastructure (represented by the anchor tower 104) can determine one or more small cells 110 (serviced by boosters 106) in which the UE 102 might receive service. If the booster(s) 106 is not already active, an activation command can be sent by the wireless infrastructure (or UE) to wake the booster 106 from a low power state. An activation response can be optionally received to notify of the success of the command. The infrastructure can provide the determined information about one or more small cells 110 to the UE 102. The UE 102 can then examine the information to determine if a connection to a booster 106 is possible. If so, the UE 102 can connect with booster 106 on Access Link B. In some embodiments, the UE 102 retains Access Link A to anchor tower 104. The UE 102 can offload some or part of wireless services onto Access Link A. In other embodiments, the UE 102 disconnects from Access Link A and moves all wireless services to Access Link B. In some embodiments Access Link A and Access Link B use a same frequency and technology. In other embodiments, Access Link A and Access Link B use different frequencies (e.g. LTE licensed frequencies and mmWave frequencies) and different link technology (e.g. LTE and Wi-Fi). In other embodiments, Access Link A and Access Link B use different frequencies and the similar link technology (e.g. LTE and LTE over mmWave).

The booster 106 can provide services that are not available through anchor tower 104. In one embodiment, the booster 106 can provide more throughput and/or smaller lag time (e.g. through mmWave technology) for high-bandwidth and/or low-latency needs of a UE 102. In another embodiment, the booster 106 can provide congestion relief for an anchor tower 104 by taking traffic normally destined for the anchor tower 104. In other embodiments, the booster 106 can provide small cell 110 coverage over areas of the macro cell 108 that have degraded performance.

A need can be based in requirements, thresholds, comparisons, services, service levels, value estimations, value comparisons, etc. For example, a wireless network device can determine that wireless service received through a network interface degrades below a threshold value. In another example, a mobile device can determine that a base station does not provide services demanded or required by the mobile device. In one example, a client can determine that service value provided by a first cellular interface is less than an estimated value over a second cellular interface. In each of these examples, the need is not met and a connection to a booster can be desirable.

Depending on the embodiment, the provisioning of small cell location information to the UE 102 can be dynamic or static. The wireless infrastructure can communicate this information through system information broadcasts, dedicated signaling or through Open Mobile Alliance Device Management (OMAR DAM) objects.

In some embodiments, the wireless infrastructure provides a broadcast of information about boosters 106 available to UE 102 within a coverage area. This broadcast of booster locations and/or service areas (e.g. small cells 110) allows for UE 102 to store and use the information when needed. In one embodiment, the UE can use the radio resource control (RRC) layer to request a broad cast of booster information from the infrastructure (see e.g. FIG. 10). In another embodiment, anchor towers 104 can broadcast booster information to UE 102 within the macro cell coverage 108. In some embodiments, a broadcast can be provided to UE 102 in an IDLE and CONNECTED mode of operation. The coverage area can be a macro cell coverage 108 or a set of anchor towers 104 that cover a region. In some embodiments, the set of towers 104 can vary with the anchor tower 104 to which the UE 102 is connected (e.g. within a 100 mile radius).

In some embodiments, the infrastructure provides dedicated signaling to the UE for information about small cells.

Depending on the embodiment, the infrastructure can provide small cell information on demand from the UE or it can provide an update of small cell information to the UE depending on UE location or environment information (e.g. geographical location, connected anchor tower, UE speed and direction, etc.). In other embodiments, the dedicated signaling can be performed at the RRC layer for a single UE residing in a CONNECTED mode of operation.

In some embodiments, the infrastructure uses OMAR DAM objects to inform the UE regarding information about small cells. In one embodiment, the OMAR DAM uses a semi-static approach that uses application layer functionality. For example, the infrastructure can send out a OMAR DAM message formatted in XML that describes an OMAR DAM object containing location information of boosters 106 and their associated small cell coverage 110.

In other embodiments, the UE 102 provides assistance data of the UE 102 to the wireless infrastructure that allows the wireless infrastructure to better determine which booster(s) 106 to provide to the UE 102. Using the assistance data, the wireless infrastructure selects a booster 106 in which the UE 102 is within the small cell 110. The booster 106 can be activated, if needed, and the UE 102 notified of the booster 106. The UE 102 can then connect to the booster 106.

Assistance data can include mobility behavior, location information and/or media consumption information. Mobility behavior can include speed, heading, direction, vector, etc. Location information can include GPS data, RF fingerprints, Wi-Fi Networks in Range, etc. Media consumption information can include quality of service (QoS) requirements, type of application, flags describing delay tolerance or real-time characteristics of traffic, etc.

Other cellular radio access technologies (such as GSM/GPRS/EDGE, or UMTS) can be used, as well as other noncellular radio access technology (such as Wi-Fi or Bluetooth). Both access links A and B may be based on the same radio access technology or on different radio access technologies. These may either be cellular or noncellular, as described above.

Inside the UE the transceiver module for Access Link B can either be on or off. In either case the UE will not receive any DL signals from the booster, as long as the booster is turned off as shown in FIG. 1.

In one embodiment, the system 100 can include a plurality of radio access networks (RANs) through which the UE 102 can access IP services or other data services, such as voice services or the Internet. The system 100 can include a global system for mobile communications (GSM) enhanced data rates for GSM evolution (EDGE) RAN (GERAN), a UTRAN, and an E-UTRAN, which provide access to communication services through a core network. Each of the RANs can operate according to a specific 3GPP radio access technology (RAT). For example, the GERAN implements GSM and/or EDGE RAT, the UTRAN implements universal mobile telecommunication system (UMTS) RAT or other 3GPP RAT, and the E-UTRAN implements LTE RAT. Other technologies can include a mmWave based RAT, 802.11a, 802.11g, 802.11n, 802.11ac, any other 802.11 RAT or an 802.16 RAT (through a WiMAX RAN).

In the embodiment, each of the RANs includes one or more base stations or other infrastructure for wirelessly communicating with the UE and providing access to communication services. For example, the E-UTRAN includes one or more eNBs, which are configured to wirelessly communicate with the UE.

While examples and an order of operations performed are discussed in this disclosure, the examples are provided with specifics for purposes of clarity. It should be recognized that the ordering of method operations can be switched and/or performed concurrently. In some methods, operations can be left out or added without departing from a scope of the embodiment described (see e.g. FIGS. 4-8). In some methods, operations may be performed by different equipment (e.g. the UE may perform operations attributed to the infrastructure or vice-versa).

FIG. 2 is an example of four versions of infrastructure to support small cells. In example A, a booster 106 has a direct connection to the core network infrastructure. In example B, a booster 106 is served by an anchor via a point-to-point backhaul link (see also FIG. 1). In example C, a booster 106 is served by an anchor via a multi-hop backhaul connection involving relay nodes 212. In example D, a remote booster 218 comprising a remote radio head (RRH) 214 is served by an anchor 104. While these examples are not exhaustive, they provide insight and examples of functionality that can be combined to service small cells.

Example A shows operation of a booster 106 without an anchor 104. The UE 102 can connect to a booster 106 over access link 106 available in a small cell provided by booster 106. The booster 106 can connect to the infrastructure (such as infrastructure in the evolved packet core (EPC)) over an interface 206 (such as an S1 interface to the EPC). In some embodiments the interface can be achieved through a wired or wireless (such as point-to-point) connection to the infrastructure.

For example, a UE 102 can request that infrastructure 202 through an anchor node 104 provide a list of boosters 106 available to the UE 102. The UE 102 can provide assistance information that includes a location of the UE 102. The infrastructure 202 can determine that a booster 106 can provide the services requested by the UE 102. The infrastructure 202 can message the booster 106 over interface 206 to cause the booster 106 to come out of a low power state. The infrastructure 202 can then send the UE 102 information about the booster 106, including location information. The UE 102 can connect to the booster 106 and drop a prior connection to the anchor. Communications can then flow from the UE 102 over an access link 204 through the booster 106 over an interface 206 to infrastructure, and to a destination (such as the Internet or a portion of the infrastructure) and back.

Example B shows operation of a booster 106 with an anchor 104. The UE 102 connects to a booster 106 over access link 106 available in a small cell provided by booster 106. The booster 106 can connect with the anchor 104 over a backhaul link 208. In some embodiments the backhaul link 208 is over point-to-point wireless. In other embodiments, the backhaul link 208 is over a wired connection. The anchor 104 can connect to the infrastructure over an interface 206. By using an anchor's 104 interface 206 to the infrastructure 202, the booster 106 can share existing high speed links to infrastructure 202 that may not be saturated even when the wireless service of an anchor is saturated.

For example a wired interface 206 (such as optical fiber) between the anchor tower 104 (such as an eNB) and the infrastructure 202 (such as an EPC) can include unused throughput (e.g. bandwidth) even when a set of UE 102 saturate the anchor's LTE RAN. Using a second communication channel (such as a point-to-point wireless interface), a booster 106 can communicate with the anchor 104 and make use of the unused throughput. UE 102 that connects to the booster 106 can therefore receive better service than if the UE 102 connected with the anchor 104. In some embodiments, the booster 106 can use a different RAT than an LTE RAT (such as mmWave small cellular technology) such that competition/interference for the spectrum of the LTE RAT is not influenced.

Example C shows operation of a booster 106 with a relay node 212. The UE 102 connects to a booster 106 over access link 106 available in a small cell provided by booster 106. The booster 106 can connect with the relay node 212 over a relay backhaul link 212. In some embodiments the relay backhaul link 212 is over point-to-point wireless. In other embodiments, the relay backhaul link 212 is over a wired connection. The relay node 212 can connect with the anchor 104 over a second backhaul link 208. The anchor 104 can connect to the infrastructure over an interface 206.

For example, a booster 106 can be placed at street level where a line of sight wireless connection with an anchor 104 is not possible. A relay node 212 can be placed within the line of sight of the booster 106 and anchor 104. The relay node 212 can then use point-to-point wireless technology to act as a bridge between the booster 106 and the anchor 104. In some embodiments, a relay can service multiple boosters 106 and an anchor can service multiple relay nodes 212 and boosters 106.

Example D shows operation of a remote booster 218 with a remote radio head 214. The UE 102 connects to a remote booster 106 over access link 106 available in a small cell provided by remote radio head 214. The remote radio head 214 can be located away from remote booster 218 and transfer signals between the remote radio head 214 and UE 102 over fronthaul link 216. The remote booster 218 can connect with the anchor 104 over a backhaul link 208. In some embodiments the backhaul link 208 is over point-to-point wireless. In other embodiments, the backhaul link 208 is over a wired connection. The anchor 104 can connect to the infrastructure over an interface 206.

One of skill in the art will recognize that numerous other components and functions can be included or implemented in the core network 202, the anchor 104 or other infrastructure.

Figure 3:
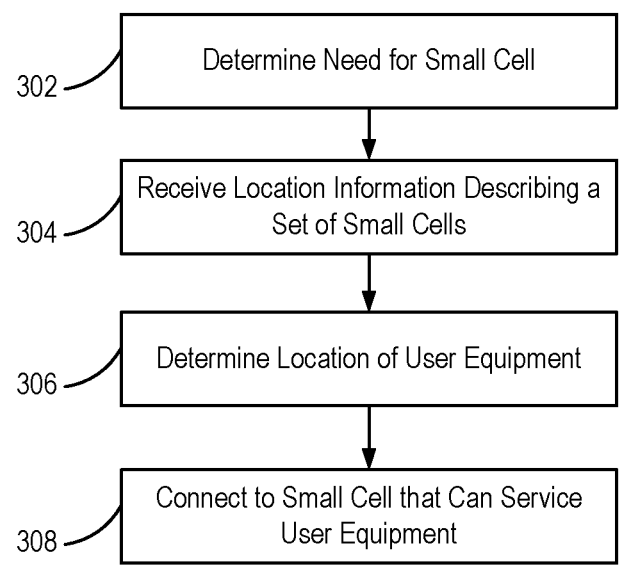
FIG. 3 is a schematic diagram of a method for accessing a small cell consistent with embodiments disclosed herein.

FIG. 3 shows a process 300 of enabling wireless communication devices in a cellular wireless network to utilize small cells having coverage within a macro cell. The method can be accomplished in a system 100 or systems 200 as shown in FIGS. 1 and 2 by a UE 102, anchor 104, core network 202 and booster 106. In block 302, a UE determines a need to connect with a small cell. In block 304, the UE receives small cell information describing a set of small cells, such as location information and booster information. In block 306, the UE determines a location of the UE. In block 308, the UE uses the location and the small cell information to connect to a small cell that can service the UE.

In some embodiments, the UE can send enhanced information (such as UE location) to infrastructure, which can select a booster to which the UE can connect. This information can be sent to the UE, which uses the information to connect to the selected booster.

Figure 4:
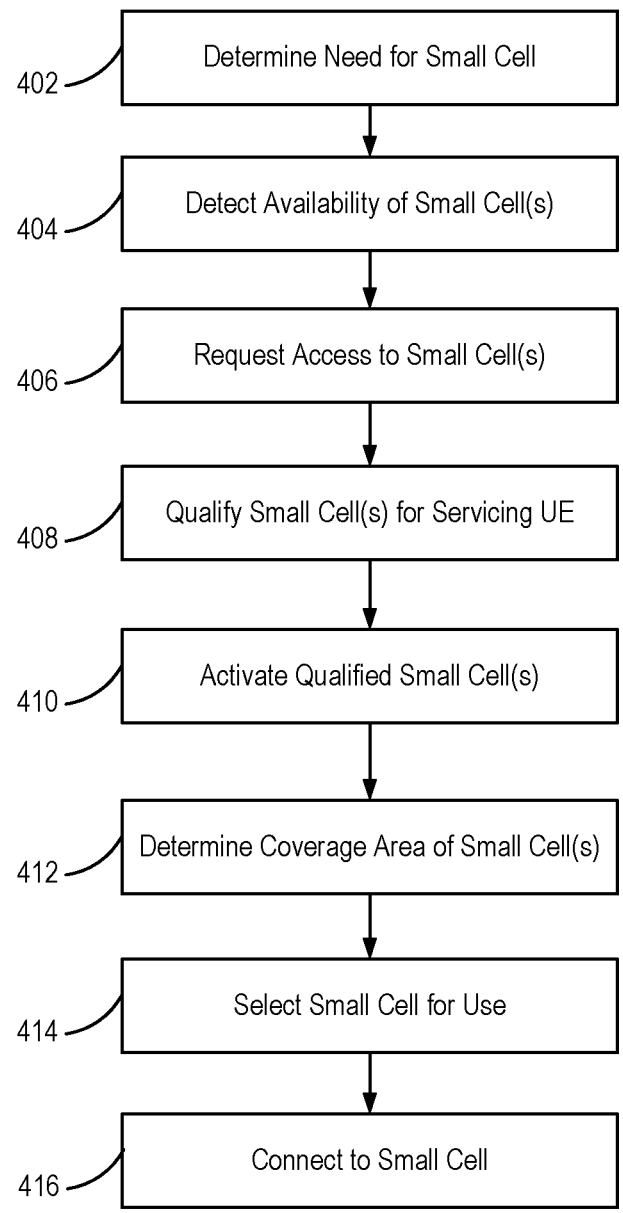
FIG. 4 is a schematic diagram of a more detailed method for accessing a small cell consistent with embodiments disclosed herein.

FIG. 4 shows a more detailed process 400 of enabling communication devices in a cellular wireless network to utilize small cells having coverage within a macro cell. The method can be accomplished in a system 100 or systems 200 as shown in FIGS. 1 and 2 by a UE 102, anchor 104, core network 202 and booster 106. In block 402, a UE determines a need to connect with a small cell, such as a saturation of a macro cell. In block 404, the UE or infrastructure determines an availability of small cells to the UE (such as the capability of the UE to communicate with small cells and/or known small cells in the area). In block 406, the UE can request access from the infrastructure to a small cell. The request can result in infrastructure making decisions or the infrastructure providing information about small cells to the UE for the UE to make the decisions. In block 408, the infrastructure or UE can qualify the small cells for servicing the UE (such as matching services provided by a booster to services available to the UE, e.g. RAN, RAT, throughput, low latency, etc.). In block 410, the infrastructure or UE can send a message causing qualified small cells to activate, such as wake up from a low power state and/or begin accepting connections from the UE. In block 412, the infrastructure or UE can determine coverage areas of small cells that can service the UE. In block 414, the infrastructure or UE selects a small cell for use by the UE. In block 416, the UE connects with the small cell and transfers one or more connections (e.g. packet data network (PDN) connections and/or voice connections) to the small cell.

Figure 5:
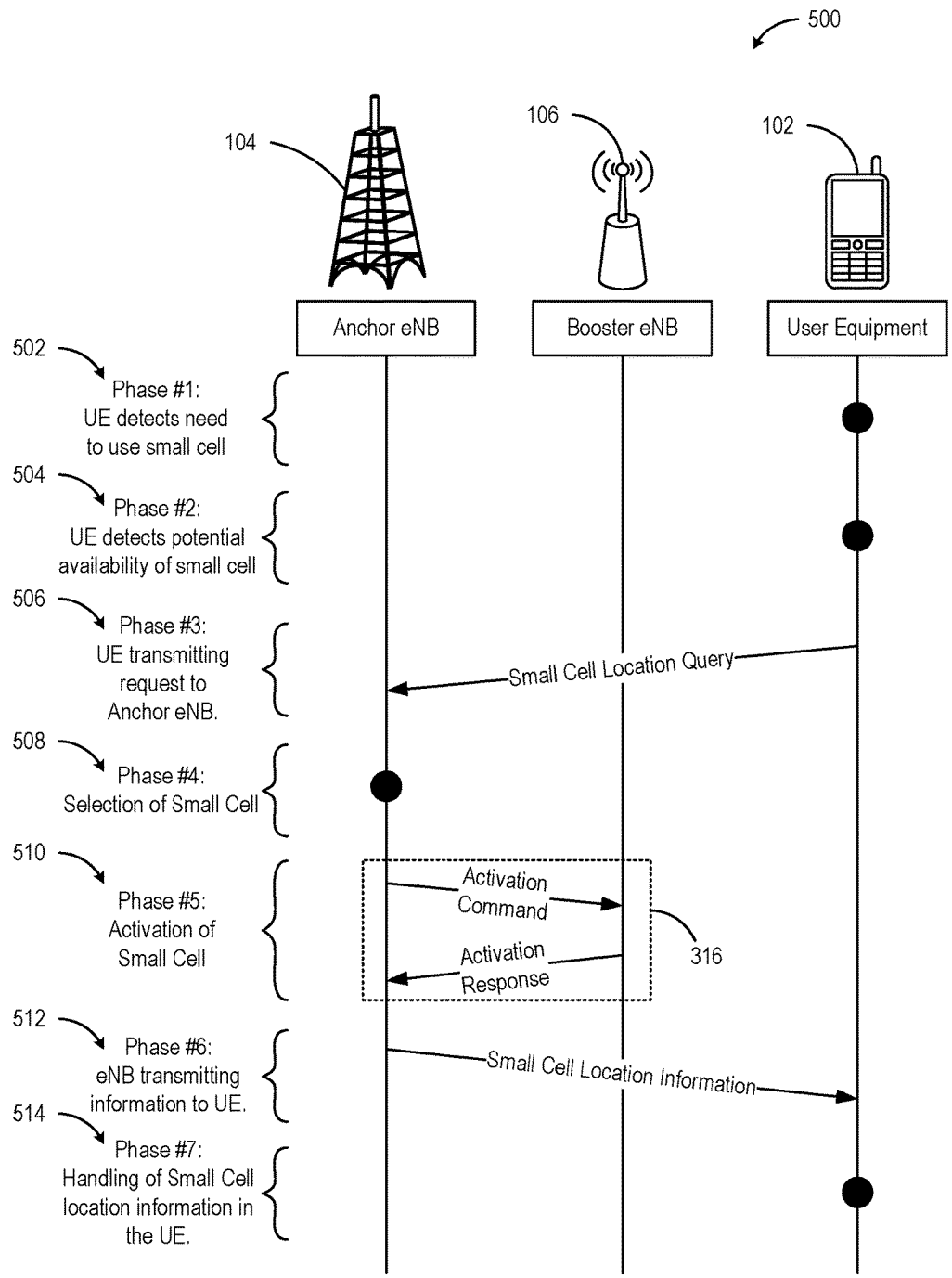
FIG. 5 is a schematic block diagram of an example of implementation of the method in FIG. 4 consistent with embodiments disclosed herein.

For example, the method of FIG. 4 can be implemented in as shown in FIG. 5. FIG. 5 shows seven phases 502, 504, 506, 508, 510, 512 and 514 that are implemented by different systems 102, 104 and 106.

In phase 1 (502), a UE 102 determines a need to connect with a small cell. The UE 102 can have multiple determinations that result in a determination for a need to connect with a small cell. In an embodiment, a UE 102 has lost connection with a small cell and determines a need to connect to another small cell. In some embodiments, In one embodiment, a user, UE 102 or an application executing on the UE 102 uses a service that is preferred, recommended, mandated for operation in conjunction with a small cell. This service restriction can come from the mobile network operator through operator policy, third party service provider through service contract, the UE 102 based on data bandwidth demand versus current data bandwidth offerings or the user through user preferences.

In phase 2 (504), the UE 102 determines an availability of small cells to the UE 102. The UE 102 enters an area/location, which is known to the UE 102 to be covered by a small cell. This knowledge can be derived by information transmitted previously to the UE 102 or the UE 102 has stored relevant location information from a previous successful connection establishment with a small cell. Location information can include geographical coordinates, RF fingerprints, etc.

In phase 3 (506), the UE 102 can request access from the anchor 104 to a small cell. These request can include messages and information elements as described in conjunction with FIG. 10. In one embodiment, the UE 102 queries location information related to small cell deployment. The UE sends out a query to the Anchor eNB asking to be provisioned with location information related to small cells' detailed coverage areas (and/or with detailed information describing the deployment locations of respective small cell base stations). In another embodiment, the UE requests activation of small cells. In order to improve capacity and/or coverage at its current location, the UE sends out an activation request to the Anchor eNB asking the infrastructure to activate one or more additional small cell(s).

In an embodiment, the UE adds assistance data to a query or request for access to small cells. The infrastructure can make meaningful decisions with respect to small cell location determination and/or small cell activation, when the UE adds to the request or query some assistance data pertaining to the UE's environment. The assistance data can be (or can be related to) mobility behavior, location information and/or media consumption information. Mobility behavior can include speed, heading, direction, vector, etc. Location information can include GPS data, RF fingerprints, Wi-Fi Networks in Range, etc. Media consumption information can include quality of service (QoS) requirements, type of application, flags describing delay tolerance or real-time characteristics of traffic, etc.

In phase 4 (508), the anchor 104 can select the small cells for servicing the UE 102. In one embodiment the anchor 104 can evaluate the UE 102 query. The infrastructure side determines small cell base stations that are capable of offering communication services to the UE. If no additional assistance data is provided by the UE in its request/query, a simple selection routine assumes that all small cells that are (or may be) operated under the UE's current macro cell are qualified for service provisioning to the UE. All small cells operating under the current macro cell can be selected as potential candidates for the UE. In another embodiment, the anchor 104 evaluates the UE query using provided assistance data. Using assistance data (e.g. UE geographical position within a macro cell, UE need for data throughput, etc.), the infrastructure side can provide more specific decisions (compared with the prior simple selection embodiment) by selecting only those small cells from the list of small cells determined by the simple selection that may serve the UE according to the assistance data. Small cells with a coverage area that does not reach out to the UE, small cells that do not provide the requested services or small cells that are currently overloaded can be excluded from the list of potential candidates for the UE.

In phase 5 (510), the anchor 104 can send a message causing qualified boosters 106 to activate. For the activation of small cells (e.g., that may have been selected in phase #4), the Anchor 104 sends out an activation request to all Booster 106 that fulfill the selection criteria (for criteria checking please see phase #4). The activation request can also be (or include) a reconfiguration command to be processed in the corresponding small cell base station. The Booster 106 can acknowledge the receipt of the activation request received from the Anchor 104.

In phase 6 (512), the anchor 104 can transmit the selected small cell information to the UE 102. The dissemination of location information related to small cells' detailed coverage areas (and/or of detailed information describing the deployment locations of the respective small cell base stations) can occur in multiple ways. Three alternatives are discussed as embodiments to get the information from the infrastructure side across the air interface to the UE, although others are also possible.

In one embodiment, a system information broadcast can be used. Here, the infrastructure side uses System Information Broadcast enhancements. This is a very dynamic approach and it takes place at RRC layer. As soon as a small cell's capability or activity changes, this change can be reflected in the System Information Broadcast almost immediately. System Information Broadcast is received by all UEs in a given cell, regardless of whether the UE is currently residing in IDLE or CONNECTED mode of operation.

A possible encoding example is given in FIG. 11. The macro cell base station (e.g., the Anchor 104) disseminates new information elements in its System Information Broadcast for the description of the small cells' detailed coverage areas (and/or for detailed information describing the deployment locations of the respective small cell base stations). If needed, these new information elements can be grouped according to the assistance data pertaining to the UE's individual situation as received from the UE in phase #3. For instance, the System Information may comprise a first set of location information intended for a first (group of) UE(s) and a second set of location information intended for a second (group of) UE(s). A group of UEs can for instance be formed with UEs having the same or similar communication needs in terms of QoS requirements and mobility characteristics, respectively.

In another embodiment, dedicated signaling can be used. The infrastructure side uses enhancements in RRC messages in order to inform selected UEs that are residing in CONNECTED mode of operation. As it can be a very dynamic approach; changes can be reflected almost immediately, whenever a small cell's capability or activity changes. The RRC can be enhanced with new and/or updated RRC messages including SmallCellLocationRequest( ), SmallCellLocationResponse( ), SmallCellLocationInfo( ) and SmallCellLocationAcknowledgement( ) as described in conjunction with FIG. 10.

In yet another embodiment, OMAR DAM can be used to provide small cell information to the UE. In the embodiment, OMAR Device Management is a protocol for device management specified by the Open Mobile Alliance (OMAR). The latest available version of the OMAR DAM specification is V2.0 (candidate release, not yet approved); the latest available approved version of OMAR DAM is V1.2.1. OMAR DAM is designed for management of mobile devices such as mobile phones, PDAs and tablet computers. Configuration of the device (including first time use, enabling and disabling features) falls within the scope of OMAR DAM as well as changing settings and parameters during device operation. The OMAR DAM protocol uses XML for data exchange, including a subset of XML which was defined by SyncML. The device management takes place by communication between a server (which is managing the device) and the client (the device being managed).

For example, the communication is initiated by a OMAR DAM server within the infrastructure, asynchronously, using an available communication channel (such as WAP Push or SMS). The initial message from server to client can be in the form of a notification, or alert message. A sequence of messages can be exchanged to complete a given device management task. OMAR DAM provides for alerts, which are messages that can occur out of sequence, and can be initiated by either server or client. The alerts can be used to handle errors, abnormal terminations etc. OMAR DAM can make use of application layer functionality to provide the small cell information. A new management object can be defined to enable dissemination of location information related to small cells' detailed coverage areas (or of detailed information describing the deployment locations of the respective small cell base stations).

In phase 7 (514), the UE 102 processes the small cell information and determines whether to connect with a booster 106. The UE 102 processes the location information about small cell coverage areas (and/or deployment locations of the respective small cell base stations) received from the Anchor 104. The UE 102 is enabled to derive whether at its current location coverage or capacity offered by small cell base stations is currently available or can additionally be made available. For this, the UE 102 can be required to take the location information (which may comprise GPS coordinates, RF fingerprints, etc.) as received, convert it into another (more suitable) format, and compare it against its own current or predicted position. After phase 7 (514), the UE 102 connects with the small cell and transfers one or more connections to the small cell.

In the Figures, including FIG. 5, an Anchor (such as an eNB) is part of the infrastructure. However, this should not be understood to be a restriction; there may be case in which the Anchor passes on requests received from the UE to some core network entity (such as the mobility management entity (MME)), or receives some instructions from a core network entity (e.g., from the MME) related to/intended for the UE. The term "infrastructure" should therefore be understood to comprise different types of core network elements and radio access network nodes. As a consequence in phases #4 (508) and #5 (510) the "infrastructure element" base station (Anchor eNB) may jointly with other "infrastructure elements" (such as the MME or home subscriber server (HSS)) evaluate any activation requests and/or location queries and/or select small cells for the information exchange in phase #6 (512).

Figure 6:
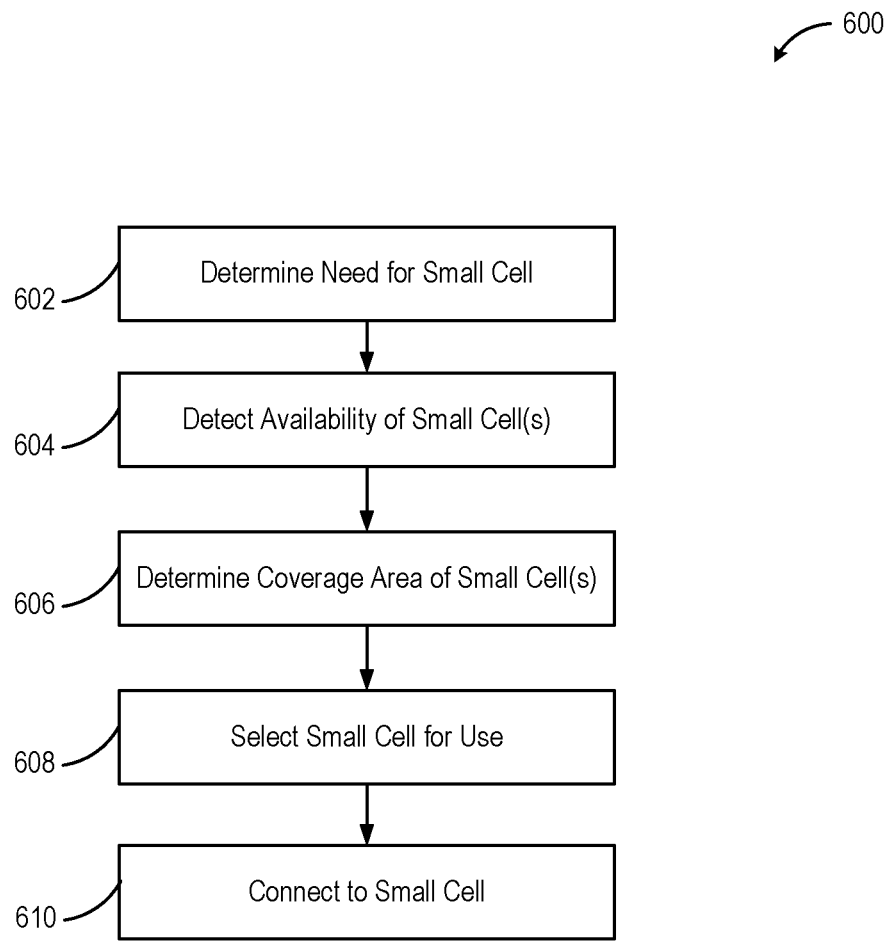
FIG. 6 is a schematic diagram of an alternate method for accessing a small cell consistent with embodiments disclosed herein.
Figure 7:
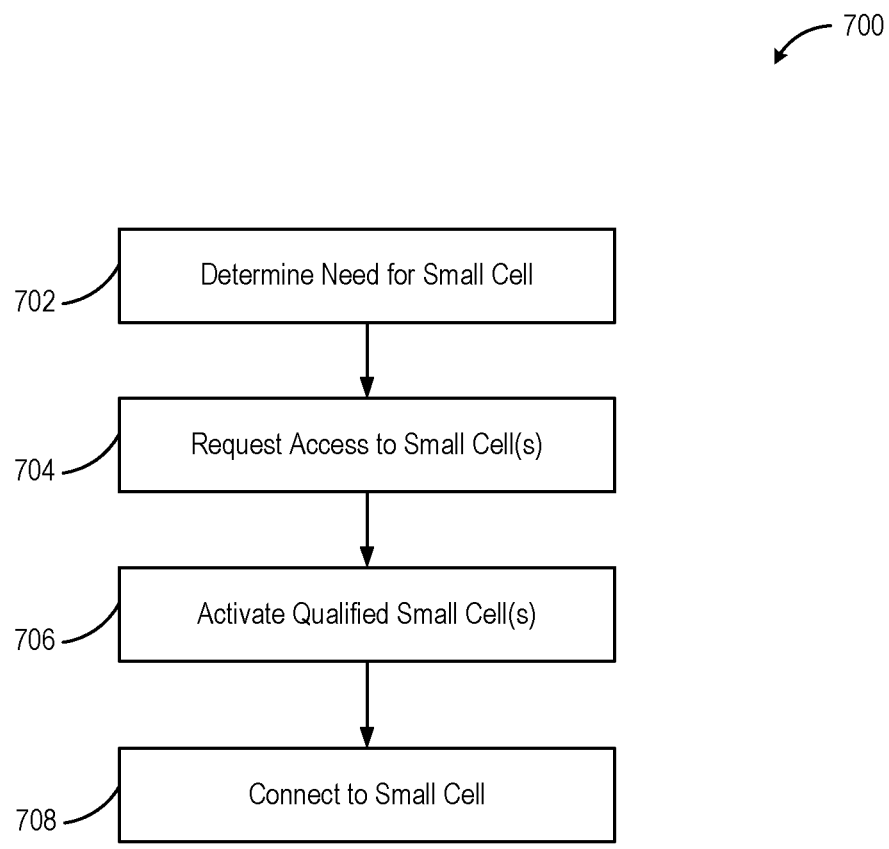
FIG. 7 is a schematic diagram of another alternate method for accessing a small cell consistent with embodiments disclosed herein.
Figure 8:
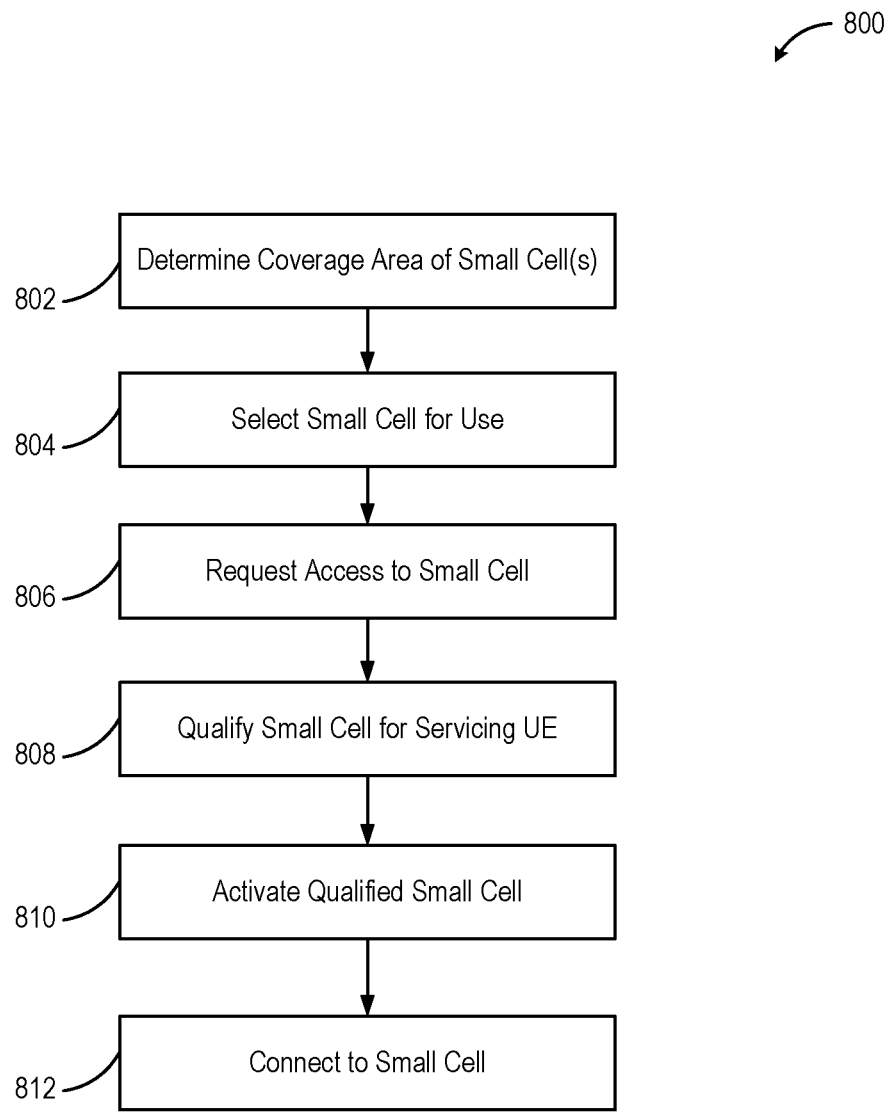
FIG. 8 is a schematic diagram of yet another alternate method for accessing a small cell consistent with embodiments disclosed herein.

The processes described in conjunction with FIGS. 4 and 5 can optionally be modified to add additional operations or remove operations. FIGS. 6-9 describe such optional processes. FIGS. 6-8 describe processes from the perspective of the UE, while FIG. 9 describes a process from the perspective of the infrastructure.

FIG. 6 shows a process 600 of enabling wireless communication devices in a cellular wireless network to utilize small cells having coverage within a macro cell. The method can be accomplished in a system 100 or systems 200 as shown in FIGS. 1 and 2 by a UE 102, anchor 104, core network 202 and booster 106. In block 602, the UE determines a need for connecting with a small cell, such as a large data demand from an application. In block 604, the UE determines availability of small cells, such as sending a request to infrastructure for a list of small cells or reviewing a stored list on the UE. In block 606, the UE can determine a coverage area of the small cells and compare the coverage with a location of the UE. In block 608, the UE can select a small cell that fits the requirements of the UE. In block 610, the UE can connect to the small cell.

For example, a cellular device determines that a current connection to an eNB over LTE will not adequately satisfy data demands of a streaming video service. The cellular device sends an RRC message to the EPC requesting a list of capable small cells, with assistance data that includes the location, travelling vector, available RATs and data demands of the streaming video service. The EPC returns an RRC response message to the UE that includes one or more information elements (IEs) that describe available boosters (such as booster eNBs and/or boosters compatible with mmWave RAT) compatible with the assistance data. The UE selects a small cell described in the IEs, such as a mmWave booster, and connects with the small cell.

FIG. 7 shows a process 700 of enabling wireless communication devices in a cellular wireless network to utilize small cells having coverage within a macro cell. The method can be accomplished in a system 100 or systems 200 as shown in FIGS. 1 and 2 by a UE 102, anchor 104, core network 202 and booster 106. In block 702, the UE determines a need to connect with a small cell. In block 704, the UE requests access to the small cell, such as a direct request to the cell or through the infrastructure. In block 706, the small cell is activated due to the request. In block 708, the UE connects to the small cell.

For example, a wireless smartphone determines that a current connection with an eNB is degraded due to saturation of the eNB bandwidth due to many UE connections. The wireless smartphone sends an RRC request to the EPC to access a small cell in a list that it had received through OMAR DM. The EPC sends a message to a booster responsible for the small cell, causing the booster to wake up from a low power state. The wireless smartphone connects to the activated booster and transfers one or more packet data network (PDN) connections to the activated booster.

FIG. 8 shows a process 800 of enabling wireless communication devices in a cellular wireless network to utilize small cells having coverage within a macro cell. The method can be accomplished in a system 100 or systems 200 as shown in FIGS. 1 and 2 by a UE 102, anchor 104, core network 202 and booster 106. In block 802, a UE determines coverage areas of small cells, such as from a stored list of information about small cells. In block 804, the UE selects a small cell for use, which can be based on requirements of the UE including location and services provided. In block 806, the UE requests access to a small cell, such as through infrastructure (e.g. the EPC). In block 808, the infrastructure can qualify the small cell for servicing the UE. In block 810, the infrastructure can activate the small cell for use with the UE, such as enabling a booster to connect with the UE. In block 812, the UE can connect to the small cell.

Depending on the embodiment, the infrastructure can respond to request for small cells at different levels. For example, an anchor tower can be configured with logic to receive and respond to requests from a UE to connect with small cells within tis macro cell service area. In another example, small cell requests can be processed by the EPC such that an anchor tower acts as a conduit through which requests pass.

Figure 9:
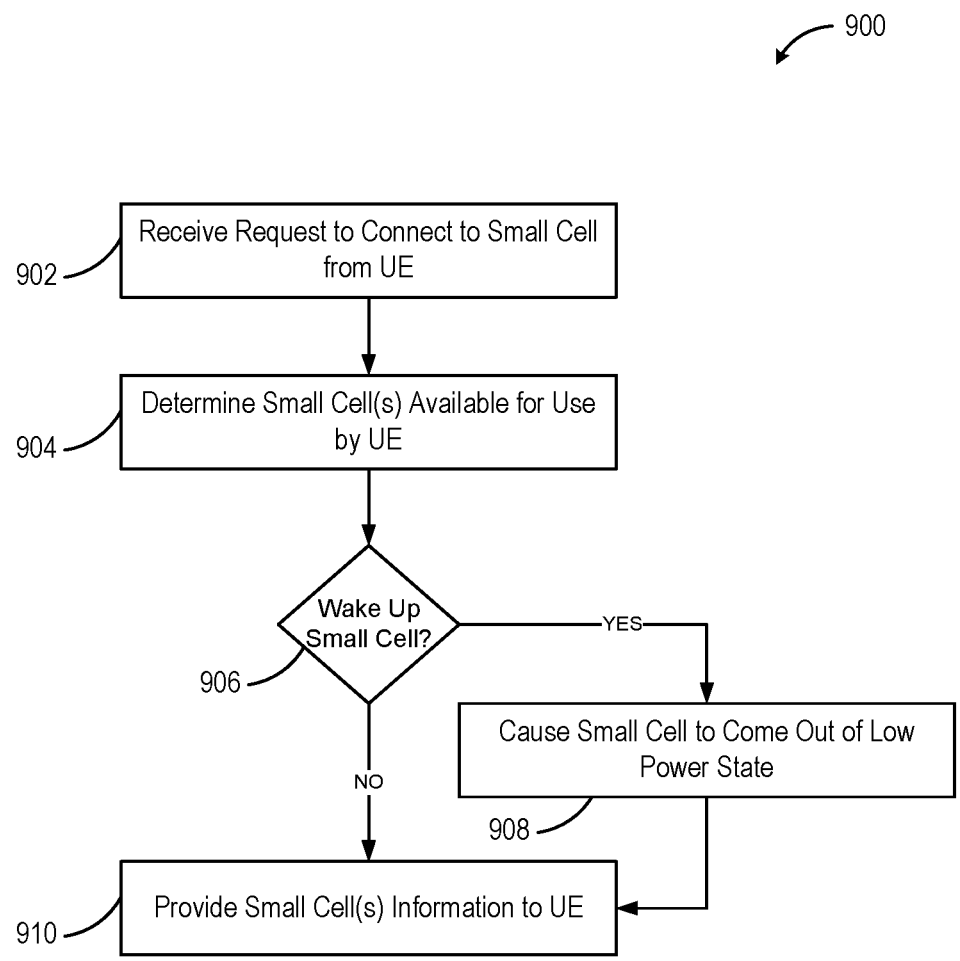
FIG. 9 is a schematic diagram of a method for enabling user equipment to access a small cell consistent with embodiments disclosed herein.

FIG. 9 shows a process 900 of enabling wireless communication devices in a cellular wireless network to utilize small cells having coverage within a macro cell. The method can be accomplished in a system 100 or systems 200 as shown in FIGS. 1 and 2 by a UE 102, anchor 104, core network 202 and booster 106. In block 902, infrastructure receives a request from a UE to connect to a small cell. In block 904, the infrastructure determines which small cells are available for use by the UE. In some embodiments, the infrastructure can narrow the list of small cells down if the UE sends assistance data. In one embodiment, the infrastructure sends a recommended small cell and additional small cells. In block 906, the infrastructure determines whether booster serving the small cell needs to wake up from a low power state. If so, in block 908, the infrastructure sends a request to the booster to come out of the low power state into an active state. In either case and in block 910, the infrastructure can then provide the small cell information to the UE.

Figure 10:
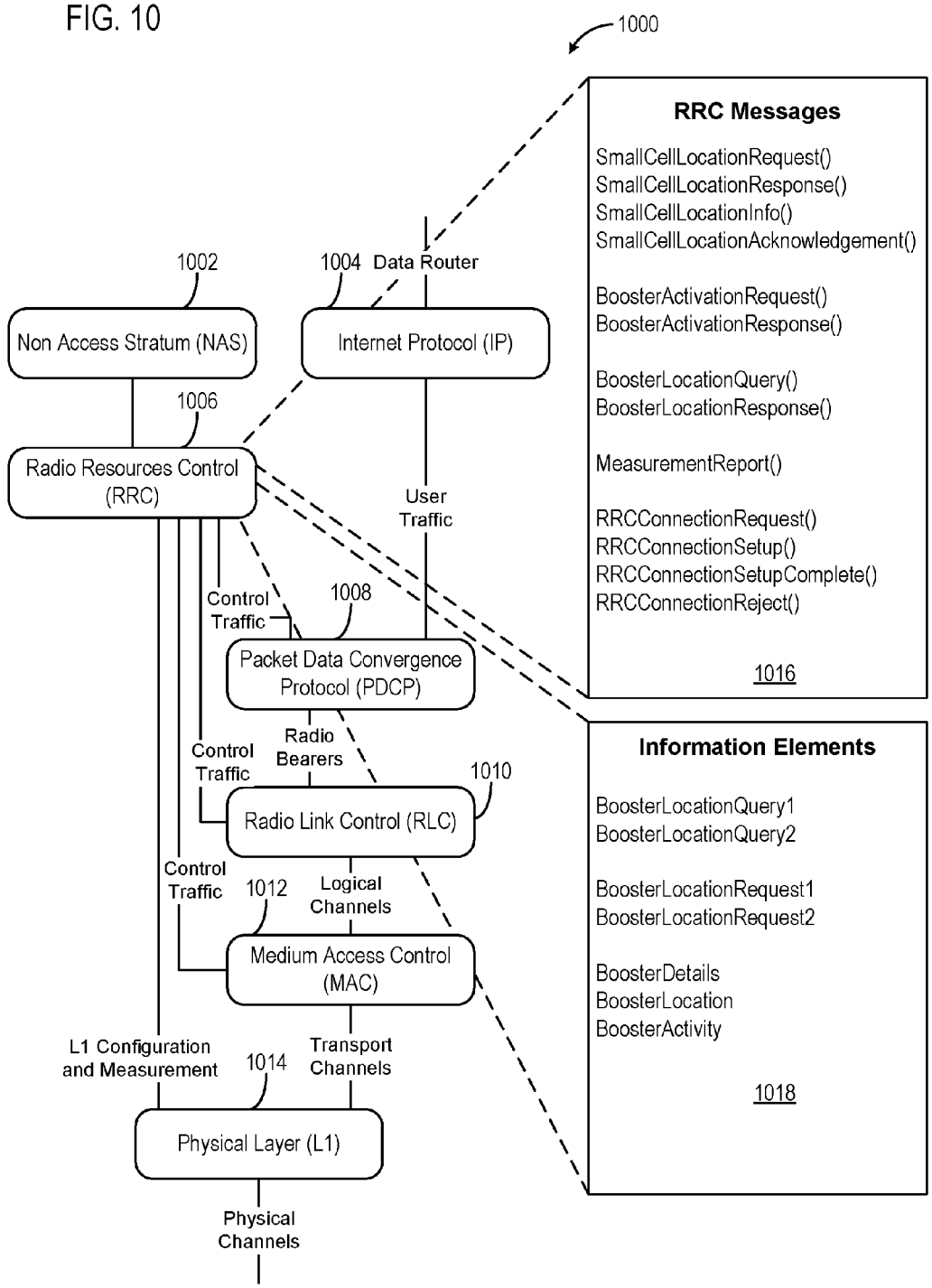
FIG. 10 is a schematic block diagram of an enhanced wireless protocol stack consistent with embodiments disclosed herein.

Various embodiments described herein can also be used to expand, update, use and/or provide new functionality to existing wireless systems (e.g. RATs, RANs, UTRAN, EUTRAN, etc.). In FIG. 10, an example of an enhanced LTE protocol stack 1000 for a UE is shown. The protocol stack 1000 can be enhanced with new messages 1016 and information elements (IEs) 1018 for use in connecting with small cells.

The stack describes protocol layers in an enhanced LTE protocol stack 1000. These layers can provide abstraction from a lower layer (represented as a layer closer to the bottom of the page). A physical layer (L1) 1014 includes systems that translate physical signals into logical data for use by the higher layers. L1 can also provide measurement and configuration services to the radio resource control (RRC) layer 1006. The medium access control (MAC) layer 1012 includes systems that perform transport as logical mapping and/or scheduling. The MAC layer 1012 includes systems that can provide format selection and measurements about the network to the RRC layer 1006. The radio link control (RLC) layer 1010 includes systems that provide segmentation, concatenation and reassembly, and can operate in different modes depending on a radio bearer. The packet data convergence protocol PDCP layer 1008 includes systems that can provide services for higher level protocols including cryptographic functions, header compression/decompression, sequence numbering and/or duplicate removal. User traffic can be sent through the PDCP layer 1008 to the internet protocol (IP) layer 1004, which is then routed to applications and systems of the UE for use. Control traffic can be sent to the RRC layer 1006. The RRC layer 1006 can provide management and control functions of the UE. RRC layer 1006 functionality can include processing of broadcast information, paging, connection management with an eNB, integrity protection of RRC messages, radio bearer control, mobility functions, UE measurement and reporting, Quality of Service management, etc. The non-access stratum (NAS) layer 1002 includes systems that can provide mobility management, call control, session management and/or identity management.

The RRC layer 1006 and NAS layer 1002 can be further enhanced with RRC messages 1016 and IEs 1018 to aid in connection with small cells. In a first example, signaling radio bearers (SRBs) were successfully established between the anchor base station and the UE, so that the UE can use these SRBs to send its location query and/or activation request to the infrastructure side. In one embodiment of the first example, a new pair of RRC Messages, BoosterActivationRequest and BoosterActivationResponse, can be used by a UE to request activation of a Booster eNB (e.g., over the LTE Uu air interface) when an RRC connection between UE and Anchor eNB is already up and running.

In another embodiment, a new pair of RRC Messages, BoosterLocationQuery and BoosterLocationResults, can be used by a UE to retrieve location details related to small cells' coverage areas (and/or information describing the deployment locations of respective small cell base stations) when an RRC connection between UE and Anchor eNB is already up and running (e.g., over the LTE Uu air interface).

In one embodiment, an already existing RRC Message MeasurementReport can be used by a UE when an RRC connection between UE and Anchor eNB is already up and running (and if it is enhanced according to this invention) to request retrieval of location details related to small cells' coverage areas (and/or information describing the deployment locations of respective small cell base stations) and/or activation of a Booster eNB.

In a second example, signaling radio bearers (SRBs) are not yet established between the anchor base station and the UE, thus UE cannot use SRBs. Instead, the UE starts the RRC Connection Establishment procedure, which can comprise random access. A first embodiment describes the successful case of the RRC Connection Establishment procedure, while A second embodiment describes the unsuccessful case. Both embodiments describe the procedure at RRC layer; the random access itself is a MAC layer procedure.

In a first embodiment, already existing RRC Messages RRCConnectionRequest and RRCConnectionSetup and RRCConnectionSetupComplete as used in the RRC Connection Establishment procedure when it is successful. The RRC Messages RRCConnectionRequest and RRCConnectionSetupComplete are going in uplink direction and may be used by the UE to request retrieval of location details related to small cells' coverage areas (and/or information describing the deployment locations of respective small cell base stations) and/or activation of a Booster eNB.

In a second embodiment, the already existing RRC Messages RRCConnectionRequest and RRCConnectionReject as used in the RRC Connection Establishment procedure when it is unsuccessful. The RRC Message RRCConnectionRequest going in uplink direction may be used by the UE to request retrieval of location details related to small cells' coverage areas (and/or information describing the deployment locations of respective small cell base stations) and/or activation of a Booster eNB.

In another example, the infrastructure side uses enhancements in RRC messages in order to inform selected UEs that are residing in CONNECTED mode of operation. Changes can be reflected almost immediately, whenever a small cell's capability or activity changes. In one embodiment, new pair of RRC Messages, SmallCellLocationRequest and SmallCellLocationResponse, can be used by a UE when an RRC connection to the base station is already up and running (over the cellular air interface). RRC Message SmallCellLocationRequest may be sent as part of phase #3 (as seen in FIG. 5), and RRC Message SmallCellLocationResponse may be sent as part of phase #6 (as seen in FIG. 5).

In another embodiment, a new pair of RRC Messages includes SmallCellLocationInfo and SmallCellLocationAcknowledgement, that can be used by a UE when an RRC connection to the base station is already up and running (over the cellular air interface). Both RRC Messages SmallCellLocationInfo and SmallCellLocationAcknowledgement can be sent as part of phase #6 (as seen in FIG. 5).

In one embodiment, an enhanced existing RRC Message can provide the small cell location information in other RRC Messages to the UE, for instance as part of an RRCConnectionReconfiguration RRC Message. Other RRC Messages can also be extended.

RRC systems can include new or enhanced Information Elements in the various RRC Messages that are transmitted over the LTE Uu air interface, thereby distinguishing between RRC Messages that are sent from the handset to the tower (uplink direction, phase #3) and RRC Messages that are sent from the tower to the handset (downlink direction, phase #6).

Some embodiments can add at least one of the following new parameters in one of the aforementioned RRCMessages in uplink direction to enable a request or query. The following descriptions of IEs are intended as examples and should not be read to limit the embodiments to these descriptions.
BoosterLocationQuery1::=BOOLEAN A BoosterLocationQuery-Type1 IE can include a range of true or false. This IE can enable the UE to request location information about booster deployment from the infrastructure side.

```
BoosterLocationQuery2 ::= SEQUENCE {
    LocationRequest BOOLEAN
    UELocation LocationInfo
}
```

A BoosterLocationQuery-Type2 IE can be a container that includes a boolean LocationRequest and UE Location Information (such as coordinates, radius, area description, movement, etc.) called LocationInfo. This can be used by the UE to request location information about booster deployment from the infrastructure side (at the UE's current location).
BoosterActivationRequest1::=BOOLEAN A BoosterActivationRequest1 IE can include a true or false range. This IE can enable the UE to request activation of booster(s) from the infrastructure side.

```
BoosterActivationRequest2 ::= SEQUENCE {
    ActivationRequest BOOLEAN
    UELocation LocationInfo
}
```

A BoosterActivationRequest2 IE can be a container that includes a boolean ActivationRequest and UE Location Information called LocationInfo. This IE can be used by the UE to request activation of booster(s) from the infrastructure side (at the UE's current location).
BoosterDetails::=ENUMERATED {Location, Activity}

A BoosterDetails IE can include a list of locations associated with activities. This IE can be used by the UE to request booster details pertaining to both booster activity and booster location from the infrastructure side. It may be combined with an indication of the UE's current location.

Some embodiments can add at least one of the following new parameters in one of the aforementioned RRC Messages in downlink direction to enable the base station to reply to the UE's request/query.
BoosterLocation::=LocationInfo A BoosterLocation IE can describe a location of a booster (such as coordinates, radius, area description, movement, etc.). This IE can be used by the infrastructure side to indicate to the UE location information pertaining to booster deployment. If the UE indicated its position in the preceding request/query, then it is clear that the location indicated in this Information Element is related to the best suitable booster for this particular UE. If the UE did not indicate its position in the preceding request/query, then this Information Element may comprise a list (for example, comprising several booster locations listed in priority order) with all suitable boosters available in the UE's current greater area (e.g., serving cell plus neighbors, or tracking area, etc.).

```
BoosterActivity ::= SEQUENCE {
    BoosterID BIT STRING (SIZE (32))
    CellID cgi-Info
    Activity ENUMERATED {on, off}
}
```

A BoosterActivity IE can be a container that includes multiple descriptions of boosters, each description including an identifier for a booster, a cell id and whether the booster has activity. This IE can be used by the infrastructure side to indicate to the UE information pertaining to booster activity (in a given location). If the UE indicated its position in the preceding request/query, then the booster activity indicated in this IE can be related to the best suitable booster for this particular UE. If the UE did not indicate its position in the preceding request/query, then this IE can comprise a list (for example, comprising several booster IDs or locations listed in priority order) with all active boosters available in the UE's current greater area (e.g., serving cell plus neighbors, or tracking area, etc.).

In FIG. 11, an example of data transmitted during a system information broadcast is shown. A System Information Broadcast can be received by all UEs in a given cell, regardless of whether the UE is currently residing in IDLE or CONNECTED mode of operation. A possible encoding example is given in FIG. 11. The macro cell base station (e.g., the Anchor eNB) disseminates new information elements in its System Information Broadcast for the description of the small cells' detailed coverage areas (and/or for detailed information describing the deployment locations of the respective small cell base stations). If needed, these IEs can be grouped according to the assistance data pertaining to the UE's individual situation as received from the UE in phase #3 (see FIG. 5). For instance, the System Information may comprise a first set of location information intended for a first (group of) UE(s) and a second set of location information intended for a second (group of) UE(s). A group of UEs can for instance be formed with UEs having the same or similar communication needs in terms of QoS requirements and mobility characteristics, respectively.

The encoding variants for LTE/LTE Advanced described herein are an example. It should be noted that similar parameters could be used on other air interface technologies according to GSM/GPRS/EDGE, UMTS, etc. Furthermore, similar parameters could be used on access links based on mmWave technology.

The encoding example shown in FIG. 11 can be part of SIBType1, or a completely new and distinct SIBType with a lower order of precedence (e.g., SIBType17, which is not yet defined in LTE/LTE Advanced).

This data can enable dissemination of a number of IEs pertaining to location information related to small cells' detailed coverage areas. Alternatively, information describing the deployment locations of the respective small cell base stations may be listed. Here, the new structure allows specifying small cell location details for up to MaxNumberSC small cells.

Figure 12:
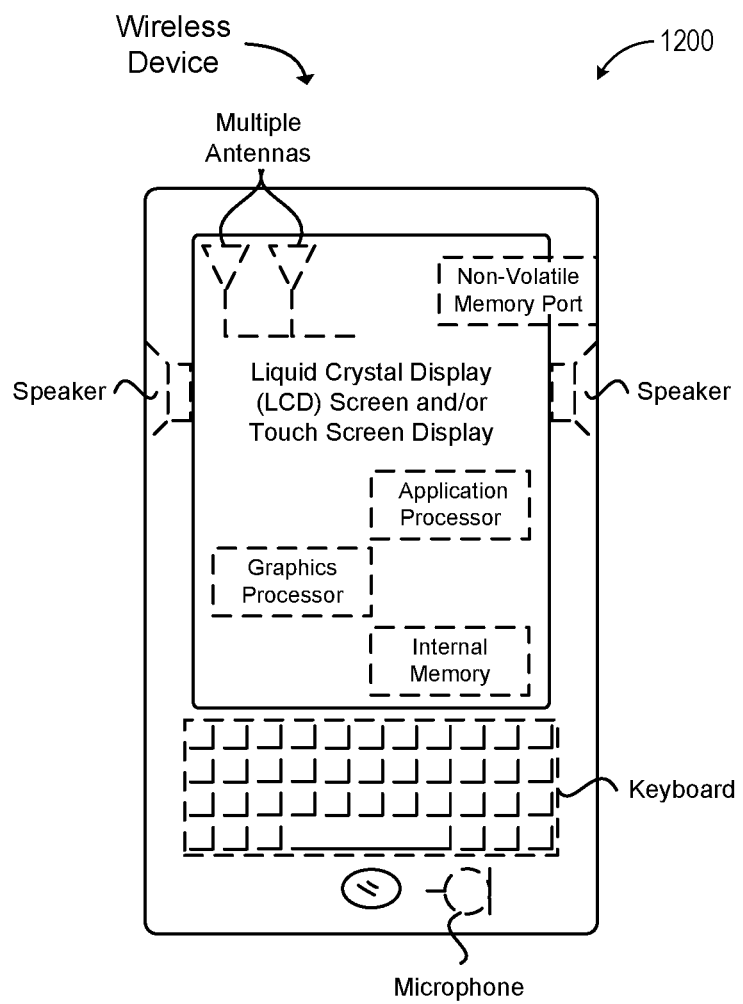
FIG. 12 is a schematic diagram of a mobile device consistent with embodiments disclosed herein.

A SmallCellInfo variable 102 can encapsulate a list of small cells, represented by SmallCellContainer 1104. SmallCellContainer 1104 can describe elements of a small cell including identifiers (SmallCellIdentifier), coverage (SmallCellDimension and its subattributes), RAT descriptions (RFfingerprint and its sub elements), fingerprint tolerance, services offered and/or quality of services (such as real-time, delay tolerant), mobility support, security, etc. RAT descriptions can include descriptions for various RATs including EUTRA 1106, UTRA 1108 and GERAN. RAT descriptions can also include identifications, measurements (e.g. reference signal received power (RSRP), reference signal received FIG. 12 is an example illustration of a mobile device, such as a UE, a mobile station (MS), a mobile wireless device, a mobile communication device, a tablet, a handset, or another type of mobile wireless device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard including 3GPP LTE, WiMAX, HSPA, Bluetooth, and Wi-Fi. The mobile device can communicate using separate antennas for each wireless communication standard or shared antennas for multiple wireless communication standards. The mobile device can communicate in a WLAN, a wireless personal area network (WPAN), and/or a WWAN.

FIG. 12 also provides an illustration of a microphone and one or more speakers that can be used for audio input and output from the mobile device. The display screen can be a liquid crystal display (LCD) screen or other type of display screen, such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the mobile device. A keyboard can be integrated with the mobile device or wirelessly connected to the mobile device to provide additional user input. A virtual keyboard can also be provided using the touch screen.

EXAMPLES

The following examples pertain to further embodiments.

Example 1 is a user equipment (UE) configured to determine that the UE has mobile broadband (MBB) network requirements that are greater than a service threshold. The service threshold is based at least in part on service provided by an anchor base station communicating with the UE over a MBB system. The UE is further configured to determine whether a small-area wireless access node service area is within a geographical area capable of servicing the UE. The small-area wireless access node service area is at least partially within the service area of an anchor node providing service to the UE. The UE is also configured to transmit a request to the anchor node requesting the service from the small-area wireless access node. The UE is further configured to receive, from the anchor node, response information comprising a location of the small-area wireless access node. The UE is also configured to process the response information to determine whether the small-area wireless access node can service the UE and connect with the small-area wireless access node.

In example 2, the UE of example 1 can be optionally configured such that to connect with the small-area wireless access node further comprises switching from MBB to millimeter wave cellular systems.

In example 3, the UE of examples 1-2 can be optionally configured such that the MBB network requirements are long term evolution (LTE) network requirements.

In example 4, the UE of examples 1-3 can be optionally configured such that to determine whether the small-area wireless access node service area is within a geographical area further comprises periodically receiving a list of small-area wireless access nodes capable of servicing the UE.

In example 5, the UE of examples 1-3 can be optionally configured such that to determine whether the small-area wireless access node service area is within a geographical area further comprises requesting a set of small-area wireless access nodes capable of servicing the UE.

In example 6, the UE of examples 1-5 can be optionally configured such that the network requirements include large data transfer ability.

In example 7, the UE of examples 1-6 can be optionally configured such that the network requirements include a quality of service greater than available through the anchor node.

In example 8, the UE of examples 1-7 can be optionally configured such that to connect with the small-area wireless access node further comprises using WiFi to communicate with the UE.

Example 9 is a wireless network device comprises a network interface, a location determination system and a processor. The network interface is configured to communicate over a wireless network with wireless network infrastructure. The location determination system is configured to provide a device location of the wireless network device. The processor is configured to execute instructions that cause the wireless network device to perform operations. The processor is further configured to determine that a threshold for requesting connection to the small cell has been met. The processor is also configured to receive location information describing locations of a set of small cells from the wireless network infrastructure. The processor is further configured to determine the device location of the wireless network device. The processor is also configured to connect to a small cell from the set of small cells that serves the location of the device.

In example 10, the wireless network device of example 9 can optionally further include an additional network interface to connect with the small cell over an additional channel of communication.

In example 11, the wireless network device of example 10 can be optionally configured such that the supplemental network interface further comprises a millimeter wave interface.

In example 12, the wireless network device of example 10 can be optionally configured such that the network interface further comprises an LTE interface.

In example 13, the wireless network device of example 9-12 can be optionally configured such that the threshold is based at least in part on a demand for data throughput that exceeds a threshold measuring the ability of a current connection to the wireless network infrastructure to deliver the data throughput.

In example 14, the wireless network device of example 9-13 can be optionally configured such that the processor is configured to execute further instructions that cause the wireless network device to transmit a request for connection to a small cell comprising assistance data, the assistance data comprising mobility behavior, location information or media consumption description.

In example 15, the wireless network device of example 9-14 can be optionally configured such that to connect to the small cell further comprises sending an activation request to the small cell to wake up the small cell.

In example 16, the wireless network device of example 9-15 can optionally further include a screen providing a user interface.

In example 17, the wireless network device of example 9-16 can optionally further include an antenna.

Example 18 is a base station comprises a network interface, storage and a processor. The network interface is configured to communicate over a wireless network with a plurality of user equipments (UEs). The storage is configured to store location data comprising locations of boosters. The processor is configured to execute instructions that cause the base station to perform operations. The processor is further configured to receive a request to connect to a booster by a UE from the plurality of UEs. The request includes UE mobility information. The processor is also configured to determine the booster available for use by the UE. The processor is further configured to provide booster information to the UE.

In example 19, the base station of example 18 can be optionally configured such that to provide the location data to the UE further comprises broadcasting the location data to the plurality of UEs, providing the location data to the UE directly or providing the location data to the UE through open mobile alliance device management (OMA DM).

In example 20, the base station of example 18 can optionally further include a supplemental network interface to provide a small cell to the UE.

In example 21, the base station of example 20 can be optionally configured such that the supplemental network interface further comprises a millimeter wave cellular interface.

In example 22, the base station of example 20 can be optionally configured such that the supplemental network interface further comprises a WiFi interface.

In example 23, the base station of examples 18-22 can be optionally configured such that to determine the booster further comprises causing the booster to transition to a powered-up state from a low-power state.

Example 24 is a wireless network infrastructure comprises a base station, a booster and a processor. The base station comprises a first network interface, a second network interface and storage. The first network interface is configured to communicate over a wireless network with a plurality of user equipments (UEs) using a first radio access technology (RAT). The second network interface is configured to communicate with a core network. The storage is configured to store location data comprising locations of small cells. The booster comprises a third network interface and a fourth network interface. The third network interface is configured to communicate over a wireless network with a plurality of user equipments (UEs) using a second RAT. The fourth network interface is configured to communicate with a core network. The processor is configured to receive a request to connect to a booster by a UE from the plurality of UEs. The processor is further configured to determine the booster available for use by the UE. The processor is also configured to provide booster information to the UE.

In example 25, the wireless network infrastructure of example 24 can optionally further include a core network that includes the processor.

In example 26, the wireless network infrastructure of examples 24-25 can optionally further include a relay configured to relay transmissions between the booster and the base station.

In example 27, the wireless network infrastructure of examples 24-26 can be optionally configured such that the base station further comprises a fifth network interface configured to communicate with the fourth network interface of the booster and transmit messages received from the booster to the core network.

In example 28, the wireless network infrastructure of examples 24-27 can be optionally configured such that the booster further comprises a remote antenna and a fronthaul from the remote antenna to the booster.

Example 29 is a method of connecting user equipment (UE) to wireless network infrastructure that includes determining a threshold for a user equipment (UE) to connect with a booster has been met. The method includes receiving location information describing locations of a set of boosters from the wireless network infrastructure. The method further includes determining the device location of the UE. The method also includes connecting to a booster from the set of boosters that serves the location of the UE.

In example 30, the method of example 29 can optionally include transmitting a request to the wireless network infrastructure for the location information.

In example 31, the method of examples 29-30 can optionally include transmitting a request to the wireless network infrastructure that includes assistance data.

In example 32, the method of examples 29-31 can optionally include transmitting a request to the wireless network infrastructure to activate the small cell.

Example 33 is a method for user equipment (UE) mobility that includes determining that a value estimation for a connection to a small cell has been exceeded. The method includes receiving location information describing locations of a set of small cells from the wireless network infrastructure. The method further includes determining the device location of the wireless network device. The method also includes connecting to the small cell that serves the location of the device.

In example 34, the method of example 33 can optionally include one or more operations. The method can optionally include connecting to the small cell further comprises connecting over a millimeter wave interface. The method can also optionally include determining the value estimation for the small cell further comprises determining that a demand for data throughput that exceeds a threshold measuring the ability of a current connection to the wireless network infrastructure to deliver the data throughput. The method can further optionally include connecting to the small cell further comprises sending an activation request to the small cell to wake up the small cell.

In example 35, the method of example 33-34 can optionally include transmitting a request for connection to the small cell comprising assistance data, wherein the assistance data comprises one or more of mobility behavior, location information and/or media consumption description.

In example 35, the method of example 33-35 can optionally include sending a message through the small cell to a core network, wherein the message is transmitted through one or more of a wireless link with an anchor tower, a wired link with the anchor tower and/or a relay between the anchor tower and the small cell.

Example 37 is an apparatus including means to perform a method as claimed in any of claims 29-36.

Example 38 is machine readable storage including machine-readable instructions, when executed, to implement a method or realize an apparatus as claimed in any of claims 29-37.

Various techniques, or certain aspects or portions thereof, can take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, an EPROM, a flash drive, an optical drive, a magnetic hard drive, or other medium for storing electronic data. The eNB (or other base station) and UE (or other mobile station) can also include a transceiver component, a counter component, a processing component, and/or a clock component or timer component. One or more programs that can implement or utilize the various techniques described herein can use an application programming interface (API), reusable controls, and the like. Such programs can be implemented in a high-level procedural or an object-oriented programming language to communicate with a computer system. However, the program(s) can be implemented in assembly or machine language, if desired. In any case, the language can be a compiled or interpreted language, and combined with hardware implementations.

It should be understood that many of the functional units described in this specification can be implemented as one or more components, which is a term used to more particularly emphasize their implementation independence. For example, a component can be implemented as a hardware circuit comprising custom very large scale integration (VLSI) circuits or gate arrays, off-the-shelf semiconductors such as logic chips, transistors, or other discrete components. A component can also be implemented in programmable hardware devices such as field programmable gate arrays, programmable array logic, programmable logic devices, or the like.

Components can also be implemented in software for execution by various types of processors. An identified component of executable code can, for instance, comprise one or more physical or logical blocks of computer instructions, which can, for instance, be organized as an object, a procedure, or a function. Nevertheless, the executables of an identified component need not be physically located together, but can comprise disparate instructions stored in different locations that, when joined logically together, comprise the component and achieve the stated purpose for the component.

Indeed, a component of executable code can be a single instruction, or many instructions, and can even be distributed over several different code segments, among different programs, and across several memory devices. Similarly, operational data can be identified and illustrated herein within components, and can be embodied in any suitable form and organized within any suitable type of data structure. The operational data can be collected as a single data set, or can be distributed over different locations including over different storage devices, and can exist, at least partially, merely as electronic signals on a system or network. The components can be passive or active, including agents operable to perform desired functions.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention can be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

Although the foregoing has been described in some detail for purposes of clarity, it will be apparent that certain changes and modifications can be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but can be modified within the scope and equivalents of the appended claims.

Those having skill in the art will appreciate that many changes can be made to the details of the above-described embodiments without departing from the underlying principles of the invention. The scope of the present invention should, therefore, be determined only by the following claims.

The invention claimed is:

1. An apparatus of a wireless network device comprising:
a network interface configured to communicate over a wireless network with wireless network infrastructure;
a location determination interface configured to receive a device location of the wireless network device;
a processor configured to execute instructions that cause the wireless network device to:
determine that a service threshold for requesting a small cell connection has been met;
process service parameters comprising location information describing locations and capabilities of a set of small cells from the wireless network infrastructure;
determine the device location of the wireless network device;
generate a request to an anchor base station to connect to a small cell from the set of small cells that serves the location of the wireless network device and is capable of providing the service threshold in the service parameters, wherein to connect to the small cell further includes sending an activation request to the small cell to wake up the small cell;
process a message including an indication of the small cell for connection as a secondary cell, wherein at least the secondary cell downlink transmission has been off; and
transfer at least some network traffic to the small cell after at least the small cell downlink has been turned on.

2. The apparatus of claim 1, further comprising an supplemental network interface to connect with the small cell over an additional channel of communication.

3. The apparatus of claim 2, wherein the supplemental network interface further comprises a millimeter wave interface.

4. The apparatus of claim 2, wherein the network interface further comprises a long term evolution (LTE) interface.

5. The apparatus of claim 1, wherein the threshold is based at least in part on a demand for data throughput that exceeds a throughput threshold measuring an ability of a current connection to the wireless network infrastructure to deliver the data throughput.

6. The apparatus of claim 1, wherein the processor is configured to execute further instructions that cause the wireless network device to transmit a request for the small cell connection comprising assistance data, the assistance data comprising mobility behavior, location information or media consumption description.

7. The apparatus of claim 1, further comprising a screen providing a user interface.

8. The apparatus of claim 1, wherein the network interface further comprises an antenna.

* * * * *